United States Patent
Fouache et al.

(12) 
(10) Patent No.: US 6,544,791 B2
(45) Date of Patent: Apr. 8, 2003

(54) NITROGENOUS COMPOSITION RESULTING FROM THE HYDROLYSIS OF MAIZE GLUTEN AND A PROCESS FOR THE PREPARATION THEREOF

(75) Inventors: Catherine Fouache, Sailly/Labourse (FR); Laurent Seigueilha, Lambersart (FR); Eric Dubois, Lestrem (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 10/252,298

(22) Filed: Sep. 23, 2002

(65) Prior Publication Data

US 2003/0049338 A1 Mar. 13, 2003

Related U.S. Application Data

(62) Division of application No. 09/775,053, filed on Feb. 1, 2001.

(30) Foreign Application Priority Data

Feb. 4, 2000 (FR) .............................. 00 01432

(51) Int. Cl.$^7$ ................................ A63F 7/06
(52) U.S. Cl. ................................ 435/681
(58) Field of Search ............... 435/68.1; 530/343, 530/350, 372, 374, 376

(56) References Cited

U.S. PATENT DOCUMENTS

| 4,282,319 A | 8/1981 | Conrad |
| 4,359,528 A | 11/1982 | Devos et al. |
| 5,141,757 A | 8/1992 | Ho Dac et al. |
| 5,962,254 A | 10/1999 | Saniez et al. |

FOREIGN PATENT DOCUMENTS

| EP | 0 298 419 | 11/1989 |
| EP | 0 461 261 | 12/1991 |
| EP | 0 518 999 | 8/1995 |
| WO | WO 94/25580 | 11/1994 |
| WO | WO 95/28850 | 11/1995 |

OTHER PUBLICATIONS

Derwent abstract N° XP002150352—1 sheet, 1999.

The Merck Index—No. XP–002150311—1 sheet, 1989.

*Primary Examiner*—Jon P. Weber
*Assistant Examiner*—Kailash C. Srivastava
(74) *Attorney, Agent, or Firm*—Sturm & Fix LLP

(57) ABSTRACT

The invention relates to a nitrogenous composition resulting from the enzymatic hydrolysis of an aqueous solution of maize gluten, having a ratio of the concentrations or inorganic phosphorus to total phosphorus (Pi/Pt) greater than or equal to 0.05, preferably from 0.05 to 0.5 and a ratio of the concentrations of amine nitrogen to total nitrogen (Na/Nt) greater than or equal to 0.025. The invention also relates to the use of a nitrogenous composition according to the invention in culture media for microorganisms which produce, in particular, organic acid.

13 Claims, No Drawings

NITROGENOUS COMPOSITION RESULTING FROM THE HYDROLYSIS OF MAIZE GLUTEN AND A PROCESS FOR THE PREPARATION THEREOF

CROSS-REFERENCE TO RELATED APPLICATIONS

This application is a Divisional of U.S. patent application Ser. No. 09/775,053, filed Feb. 1, 2001 Publication No. 20010029042, the disclosure of which is being incorporated herein by reference in its entirety.

TECHNICAL FIELD

The present invention provides a nitrogenous composition resulting from the enzymatic hydrolysis of maize gluten.

The present invention also relates to a process for the preparation of such a nitrogenous composition and to the application thereof in culture media for the fermentation industries.

This nitrogenous composition may also be used as a feedingstuff or food additive in compositions for animals.

BACKGROUND OF THE INVENTION

Maize gluten is known to be a source of nitrogen in the fermentation industries and a constituent of certain foodstuffs.

However, due to the viscoelastic properties of maize gluten, it must be solubilised if it is to be used as a source of nitrogen in bioengineering processes or as a feedingstuff or food additive.

This solubulisation of gluten may be carried out by chemical means (alkaline hydrolysis or acid hydrolysis) or by enzymatic means.

For example, patent application WO 95.28850 describes a method of solubilising plant proteins by using enzymes with phytase activity in combination with one or more enzymes with protease activity, one or more enzymes with lipase activity and one or more enzymes with glycosidase activity. These enzymes are extracted from microorganisms of the Bacillus, Pseudomonas, Kluveromyces, Saccharomyces, Aspergillus type.

The mixture thus hydrolysed is then used in animal feed.

The patent EP 518.999 describes the preparation of partially hydrolysed products by virtue of a specific treatment using a particular serine protease produced by *Bacillus licheniformis*. These products are of interest for the preparation of foods for human consumption and particularly in infant foods as an agent which limits the allergenic capacity of the proteins of full cream milk, and on account of their properties of better digestibility.

Patent application EP 461.261 describes the preparation of particular oligopeptides by enzymatic hydrolysis of plant proteins in order to obtain a high proportion of branched amino acids and the use thereof in food preparations intended for patients suffering from liver diseases.

A process which allows the preparation of an aromatiser by enzymatic hydrolysis of a substance rich in plant proteins without having to use purified exopeptidases to take away the bitterness, whilst giving it attractive organoleptic properties, has been described in patent EP 429.760.

The possibility of using an hydrolysate of plant proteins in a fermentation medium is also mentioned in patent application WO 94.25580.

However, none of these documents indicates or suggests that a hydrolysate of maize gluten having a particular composition in terms of its phosphorus and nitrogen content, its concentration of soluble and insoluble proteins and its distribution spectrum of amino acids, may be particularly suitable for fermentation applications, particularly in the field of fermentations of microorganisms which produce organic acids and/or in animal feed applications.

DESCRIPTION OF THE INVENTION

The invention relates primarily, therefore, to a nitrogenous composition resulting from the hydrolysis of maize gluten, having a ratio of the concentrations of inorganic phosphorus to total phosphorus (Pi/Pt) greater than or equal to 0.05, preferably from 0.05 to 0.5, and a ratio of the concentrations of amine nitrogen to total nitrogen (Na/Nt) greater than or equal to 0.025.

The concentrations of inorganic phosphorus and total phosphorus are measured by methods known on the whole by the skilled person, such as those described below.

With regard to inorganic phosphorus, the reference method consists in extracting the mineral or inorganic phosphorus by a solution of trichloracetic acid, forming a phosphomolybdic complex by reaction between inorganic phosphorus and ammonium molybdate, and measuring the absorbance of this complex with a spectrophotometer at a wave length of 360 nm.

The determination of total phosphorus is carried out by a method which is based on the detection of phosphorus on a plasma emission spectrometer (JY83 type from JOBIN YVON following the constructor's specifications). A preliminary step is used, however, which consists in destroying the organic materials of the products to be determined in order to convert all the organic phosphorus to inorganic phosphorus (the total phosphorus is therefore the organic phosphorus plus the inorganic phosphorus), by mineralisation using a sulfonitric mixture.

The ratio of the inorganic phosphorus concentration to the total phosphorus concentration (Pi/Pt) is preferably greater than or equal to 0.05, preferably from 0.05 to 0.5.

The concentrations of amine nitrogen and total nitrogen are measured by known methods such as those described below.

The determination of amine nitrogen is carried out by allowing the amine function of the product to be determined to react with trinitrobenzenesulfonic acid (TNBS) in order to produce a chromophore group, the absorbance of which is measured at 340 nm.

The determination of total nitrogen is carried out according to the ISO 3188 method which involves mineralisation of the product to be determined with sulfuric acid in the presence of a catalyst, then alkalinisation of the reaction products and distillation of the ammonia liberated and collected in a solution of boric acid which is titrated with a solution of sulfuric acid.

The total protein content and the soluble protein content of the composition according to the invention are, respectively, from 20% to 80%, based on dry substance, and from 30% to 80%, based on dry substance.

The term total protein content means the total nitrogen multiplied by a factor of 6.25.

The term soluble protein content means the total nitrogen multiplied by a factor of 6.25 contained in the soluble fraction which corresponds to the supernatant obtained after dispersion of the sample in distilled water and centrifugation.

Moreover, the nitrogenous composition according to the invention has a free alanine content greater than or equal to 100 mg/100 g dry substance, preferably 500 mg/ 100 g dry substance, a free leucine content greater than or equal to 200 mg/100 g dry substance, preferably 1000 mg/100 g dry substance, and a free phenylalanine content greater than or equal to 100 mg/100 g dry substance, preferably 500 mg/100 g dry substance.

The invention relates secondly to a process for the preparation of a nitrogenous composition resulting from the enzymatic hydrolysis of maize gluten by a particular combination of enzymes.

The maize gluten used is preferably a slurry of maize proteins obtained after grinding grains of steeped maize and after separating the germs and starch by a physical process based on the difference in density of the compounds.

Maize gluten may also be extracted from the slurry of proteins by physical separation of the centrifugation or filtration type and then resuspended in water in order to carry out the enzyme treatment according to the invention.

The process according to the invention consists in subjecting an aqueous solution of maize gluten to an enzyme treatment using at least one protease and optionally at least one enzyme selected from the group comprising a complex of endo- and exopeptidases, an enzyme complex which hydrolyses the polysaccharides of maize other than starch, a phytase and a glucoamylase.

In a first method of preparing the nitrogenous composition according to the invention, an aqueous solution of maize gluten is treated in a series of steps comprising:

introducing successively into the aqueous solution of maize gluten at least one protease then optionally a complex of endo- and exopeptidases, allowing the enzymes to act, with stirring, inactivating the enzymes, optionally separating the insoluble matter, recovering the nitrogenous composition thus obtained.

The proteases are preferably papain (for example, COROLASE® L10 sold by the company RÖHM ENZYME) and/or an alkaline protease (such as the alcalase isolated from *B. licheniformis*). This first hydrolysis reaction will be performed advantageously at a pH of 8.

The complex of endo- and exopeptidases will be preferably KOJIZYME™ (sold by the company NOVO NORDISK). The enzyme reaction is then performed at a pH from 6 to 6.5, as will be illustrated below.

In a second method of preparing the nitrogenous composition according to the invention, said aqueous solution of maize gluten is treated in a series of steps comprising:

introducing simultaneously into the aqueous solution of maize gluten at least one protease, at least on enzyme complex which hydrolyses the polysaccharides of maize other than starch, at least one phytase and at least one glucoamylase, allowing the enzymes to act, with stirring, inactivating the enzymes, optionally separating the insoluble matter, recovering the nitrogenous composition thus obtained.

The proteases are preferably an acid protease (for example, acid Bioprotease A sold by the company BIOCON) and/or papain (for example, COROLASE® L10 sold by the company RÖHM ENZYME).

The enzyme complex which hydrolyses the polysaccharides of maize other than starch is SPEZYME CP sold by the company GENENCOR (composed of a complex of cellulase, β-glucanase and pentosanase enzyme activities).

Phytase is, for example, that produced by the company BASF (NATUPHOS).

Glucoamylase is of the OPTIDEX L300 type produced by the company GENENCOR.

The Applicant company has found that the treatment by all these enzymes takes place advantageously in an aqueous solution of a maize gluten the dry substance content of which is from 5% to 50%, at a pH from 5 to 9, a temperature ranging from 45° C. to 65° C. and with a reaction time from 5 hours to 24 hours.

When the Pi/Pt and Na/Nt ratios reach the desired values, the enzyme reactions may be stopped by inactivating the enzymes. To this end, physical means (temperature) and/or chemical means (pH) are used. The reaction medium preferably undergoes heating at 60° C.–90° C. for a period from 10 minutes to 60 minutes.

The process according to the invention then consists in concentrating the nitrogenous composition thus obtained so that it may optionally undergo an atomisation step.

Insoluble matter is then advantageously removed from the nitrogenous composition which is concentrated by evaporation, either to be kept in the liquid form or to be atomised or dehydrated in a suitable manner.

The composition according to the invention, by virtue of its particular characteristics, has a certain advantage when it is used, advantageously after removal of the insoluble matter, as a microbial growth substance in the fermentation industries.

In particular, this composition is a satisfactory substrate for the production or organic acids by microbiological means.

The Applicant company ascertained that microorganisms could be selected advantageously from the group comprising microorganisms of the Bacillus, Lactobacillus and Pseudomonas type, as will be illustrated below.

Moreover, the nitrogenous composition according to the invention, without the need to remove the insoluble matter therefrom, is of interest to the food industry on account of its nutritional properties and may thus be used as a feedingstuff in compositions intended more particularly for animal feed.

Other characteristics and advantages of the present invention will become clearly apparent from reading the examples given below which illustrate the invention without limiting its scope.

EXAMPLE 1

A suspension of maize proteins containing 12.2% of dry matter was heated to 60° C.

The pH was adjusted to 8 by adding 10 N NaOH.

ALCALASE 2.4 L having 2.4 AU/g of *B. licheniformis* was then added in a quantity of 1%/dry substance and COROLASE® L10 having more than 757 $U_{HB}$/g was added in a quantity of 0.1%/dry substance.

The temperature was kept at 60° C. for 7 hours, then temperature control was stopped for 16 hours to allow it to fall to 50° C.

The final pH of the reaction was 7.

KOJIZYME™ having 1000 LAPU/g was then added in a quantity of 1%/dry substance.

After 2.5 hours' reaction, the reaction was stopped by lowering the pH to 4 and by raising the temperature of the reaction medium to 65° C.

Optional filtration of the medium thus obtained was then carried out on an SCT type A filtration module sold by the company SCT and fitted with a ceramic membrane with a size grading threshold of 200 nm.

The filtration temperature was then fixed at 65° C.

The solution, whether filtered or not, was concentrated by evaporation to a dry matter content of 50%.

The concentrated solution was kept at a temperature of the order of 60° C. and atomised in an atomisation tower of the NIRO type with an air inflow temperature from 165° C. to 180° C., and an air outflow temperature from 65° C. to 90° C.

Tables I and II below set out the results of the animogram analyses and physico-chemical data determined after enzyme treatment of the aqueous solution of maize gluten, whether to not it was completed with the step to remove insoluble matter by filtration. Composition A is the composition which did not undergo the additional filtration step.

TABLE I

|            | FREE (G/100 G) | | TOTAL (G/100 G) | |
|------------|----------------|---|-----------------|---|
| AMINO ACIDS | Composition A | | Composition A | |
| Asp        | 0.02 | 0.10 | 2.31 | 3.20 |
| Thr        | 0.23 | 0.43 | 1.78 | 1.95 |
| Ser        | 0.13 | 0.44 | 1.86 | 2.61 |
| Asn        | 0.15 | 0.41 | Nd   | 0    |
| Glu        | 0.03 | 0.26 | 7.93 | 10.49 |
| Gln        | 0.15 | 0.31 | Nd   | 0    |
| Gly        | 0.11 | 0.22 | 1.20 | 1.56 |
| Ala        | 0.53 | 1.43 | 3.49 | 5.23 |
| Citrulline | 0.05 | 057  | Nd   | 0.39 |
| Val        | 0.37 | 0.75 | 1.77 | 2.59 |
| Cystine    | 0.08 | 0.01 | 0.67 | 0    |
| Met        | 0.17 | 0.47 | 0.49 | 0    |
| Iso        | 0.25 | 0.61 | 1.49 | 2.14 |
| Leu        | 1.11 | 3.42 | 5.73 | 8.74 |
| Tyr        | 0.20 | 0.03 | 1.81 | 1.82 |
| Phe        | 0.53 | 1.22 | 2.13 | 3.16 |
| Ornithine  | 0.02 | 0.23 | 0.09 | 0    |
| Lys        | 0.06 | 0.22 | 0.73 | 0.71 |
| His        | 0.10 | 0.27 | 0.83 | 0.85 |
| Arg        | 0.27 | 0.30 | 1.25 | 1.14 |
| Pro        | 0.19 | Nd   | 3.16 | 0.74 |
| GABA       | 0.16 | 0.24 | 0.20 | 4.90 |

TABLE II

|                              | Composition A | |
|------------------------------|------|------|
| Total nitrogen (% crude)     | 9    | 9.6  |
| Amine nitrogen (% crude)     | 1    | 3.2  |
| Inorganic phosphorus (% crude) | 0.06 | 0.06 |
| Total phosphorus (% crude)   | 0.64 | 0.5  |

EXAMPLE 2

A suspension of maize proteins containing 12.2% of dry matter was treated under the same conditions as in Example 1 but without the additional action with KOJIZYME™.

After this 16 hour reaction, the medium thus obtained was filtered over an SCT type A filtration module sold by SCT and fitted with a ceramic membrane with a size grading threshold of 200 nm.

The filtration temperature was fixed at 65° C.

The filtered solution was concentrated by evaporation to a dry matter content of 50%.

The concentrated solution was kept at a temperature of the order of 60° C. and atomised in an atomisation tower of the NIRO type with an air inflow temperature from 165° C. to 180° C. and an airflow temperature from 65° C. to 90° C.

Tables III and IV below set out the results of the aminogram analyses and physico-chemical data determined on the nitrogenous composition B according to the invention thus obtained.

TABLE III

| Amino acids | Free (g/100 g) | Total (g/100 g) |
|-------------|----------------|-----------------|
| Asp         | 0.06 | 3.5  |
| Thr         | 0.08 | 1.7  |
| Ser         | 0.18 | 2.5  |
| Asn         | 0.13 | Nd   |
| Glu         | 0.12 | 12   |
| Gln         | Nd   | Nd   |
| Gly         | 0.11 | 1.7  |
| Ala         | 0.30 | 4.7  |
| Citrulline  | 0.08 | Nd   |
| Val         | 0.25 | 2.6  |
| Cystine     | Nd   | Nd   |
| Met         | 0.11 | Nd   |
| Iso         | 0.10 | 2.1  |
| Leu         | 0.47 | 8    |
| Tyr         | 0.05 | 1.7  |
| Phe         | 0.37 | 3    |
| Ornithine   | 0.10 | 0.23 |
| Lys         | 0.08 | 1    |
| His         | 0.03 | 1.1  |
| Arg         | 0.05 | 1.6  |
| Pro         | 0.21 | 4.4  |
| GABA        | 0.10 | 0.12 |

TABLE IV

| Total nitrogen (% crude)       | 9    |
| Amine nitrogen (% crude)       | 1.7  |
| Inorganic phosphorus (% crude) | 0.05 |
| Total phosphorus (% crude)     | 0.52 |

EXAMPLE 3

A suspension of maize proteins containing 14% dry matter was heated to 50° C. The pH of the solution of maize proteins was 4.4.

Acid Bioprotease A BIOCON having 600,000 U/g in a quantity of 0.9%/dry substance, phytase NATUPHOS 5000 having 5000 UP/g in a quantity of 0.1%/dry substance, SPEZYME CP having 90 GCU/ml in a quantity of 0.1%/dry substance, OPTIDEX 300 A having 300 GAU/ml in a quantity of 0.1%/dry substance and papain PROFIX 100 having 100 TU/g in a quantity of 0.1%/dry substance were added simultaneously to the reaction medium.

Incubation was carried out for 17 h with stirring, the temperature being controlled at 50° C. The reaction was stopped by lowering the pH to 3.5 and by raising the temperature of the reaction medium to 65° C. The filtration and atomisation conditions were the same as those given in Example 1.

Tables V and VI below set out the results of the aminogram analyses and physico-chemical data determined on the nitrogenous composition C according to the invention thus obtained.

TABLE V

| AMINO ACIDS | FREE (G/100 G) | TOTAL (G/100 G) |
|-------------|----------------|-----------------|
| Asp         | 0.16 | 2.10 |
| Thr         | 0.16 | 1.56 |

TABLE V-continued

| AMINO ACIDS | FREE (G/100 G) | TOTAL (G/100 G) |
|---|---|---|
| Ser | 0.19 | 1.78 |
| Asn | 0.15 | Nd |
| Glu | 0.18 | 7.57 |
| Gln | 0.39 | Nd |
| Gly | 0.10 | 1.07 |
| Ala | 0.82 | 3.28 |
| Citrulline | 0.18 | Nd |
| Val | 0.30 | 1.66 |
| Cystine | Nd | 0.70 |
| Met | 0.33 | 0.51 |
| Iso | 0.17 | 1.31 |
| Leu | 1.64 | 5.19 |
| Tyr | 0.44 | 1.52 |
| Phe | 0.72 | 1.84 |
| Ornithine | 0.04 | 0.16 |
| Lys | 0.18 | 0.65 |
| His | 0.13 | 0.79 |
| Arg | 0.34 | 1.12 |
| Pro | 0.29 | 3.38 |
| GABA | 0.17 | 0.27 |

TABLE VI

| | |
|---|---|
| Total nitrogen (% crude) | 9 |
| Amine nitrogen (% crude) | 1 |
| Inorganic phosphorus (% crude) | 0.33 |
| Total phosphorus (% crude) | 0.88 |

EXAMPLE 4

The production of lactic acid was carried out under the following conditions. The microorganism used was a *Lactobacillus plantarum*.

The B. BRAUN production fermenter with a useful volume of 15 l was inoculated with *Lactobacillus plantarum* originating from a 16 h preculture medium.

This preculture medium, introduced in a quantity of 750 ml into a 2 l Erlenmeyer flask, was composed of 60 g/l of glucose, 10 g/l of yeast extract, 30 g/l of $CaCO_3$ seeded using a square agar plate on which *Lactobacillus plantarum* had been growing for 24 h. Stirring was fixed at 150 rpm with the laboratory orbital stirrer, at a temperature of 46° C. The initial pH was fixed at 7.

The production fermenter was seeded with 5% of the preculture medium and the production medium was then stirred at 150 rpm at 46° C., the pH being controlled at 5.8 with 50% potassium hydroxide solution.

60 g/l of glucose were used as a source of carbon which could be assimilated by *Lactobacillus plantarum*.

The composition of the 7 production media which differed in terms of their nitrogenous substrates (but complying with the nitrogen equivalent), and the lactic acid productivities are given in Table VII below.

TABLE VII

| COMPOSITION | CONCENTRATION IN THE PRODUCTION MEDIUM (G/L) | PRODUCTIVITY AT 24 H (G/L/H) |
|---|---|---|
| Nitrog. composition A | 10 | 1.7 |
| Nitrog. composition B | 10 | 1.8 |
| Nitrog. Composition C | 10 | 1.75 |
| Yeast extract | 10 | 2.1 |
| Corn steep liquor | 25 | 1.8 |

It was observed that the potassium lactate productivity was equivalent when the nitrogen source was composed of the nitrogenous composition according to the invention, yeast extracts, or corn steep liquor.

However, it is acknowledged that, when comparing the cost of producing yeast extracts with that of the nitrogenous compositions according to the invention, it is more advantageous to use said nitrogenous composition which is easy to prepare and less expensive than conventional yeast extracts.

As regards corn steep liquor, with an equivalent nitrogen input to obtain the same productivity as with the nitrogenous compositions according to the invention, it is necessary to introduce a much greater amount of dry matter. However, it is known by the skilled person that corn steep liquor contains other constituents which are likely to interfere with the production of calcium lactates (for example, due to its own high lactate content). Moreover, corn steep liquor is also a complex medium which will require the use of cumbersome and expensive purification techniques in order to recover said calcium lactate.

EXAMPLE 5

The production of lactic acid was carried out under the following conditions. The microorganism used was *Bacillus coagulans* DSM 2311.

The NEW BRUNSWICK production fermenter with a useful volume of 2 l was inoculated with *Bacillus coagulans* originating from a 16 h preculture medium.

This preculture medium introduced in a quantity of 150 ml into a 500 ml Erlenmeyer flask, was composed of:

20 g/l of glucose, 10 g/l of nitrogenous composition A according to the invention (Example 1), 1.5 g/l of $(NH_4)_2PO_4$, 10 g/l of $CaCo_3$, or, for reference 20 g/l of glucose, 3 g/l of yeast extract, 1.5 g/l of $(NH_4)H_2PO_4$ and 3 g/l of $CaCO_3$ seeded using a square agar plate on which *Bacillus coagulans* had been growing for 24 h at 44° C.

Stirring was fixed at 100 rpm with a laboratory orbital stirrer at a temperature of 44° C. The pH was brought to 6.5 with NaOH.

The production fermenter was seeded with 10% of the preculture medium and the production medium was then stirred at 100 rpm, at 44° C., the pH being controlled at 6.5 with 20% $NH_4OH$.

80 g/l of glucose were used as a source of carbon which could be assimilated by *Bacillus coagulans*.

The composition of the 2 production media which differed in terms of the nature of their nitrogenous substrates (but complying with the nitrogen equivalent) and the lactic acid productivities are given in Table VIII below.

TABLE VIII

| COMPOSITION | CONCENTRATION IN THE PRODUCTION MEDIUM (G/L) | PRODUCTIVITY AT 24 H (G/L/H) |
|---|---|---|
| Nitrog. composition A | 10 | 1.5 |
| Nitrog. composition C | 10 | 1.5 |
| Yeast extract (reference) | 10 | 0.7 |

For *B. coagulans*, the nitrogenous compositions according to the invention therefore constitute a particularly suitable source for the production of calcium lactate.

EXAMPLE 6

The production of maltobionic acid was carried out under the following conditions. The microorganism used was a *Pseudomonas cepacia*.

The NEW BRUNSWICK production fermenter with a useful volume of 2 l was inoculated with *Pseudomonas cepacia* originating from a 24 h preculture medium.

This preculture medium, introduced in a quantity of 50 ml into a 500 ml Erlenmeyer flask, was composed of:

5 g/l of glucose, 10 g/l of nitrogenous composition A according to the invention (Example 1), 10 g/l of $CaCO_3$, or, for the reference 5 g/l of glucose, 7.5 g/l of yeast extract, 5 g/l of corn steep liquor 50% by weight, 0.2 g/l of $MgSO_4$, 1 g/l of $KH_2PO_4$ and 3 g/l of $CaCO_3$ seeded using a square agar plate on which *Pseudomonas cepacia* had been growing for 24 h at 30° C.

Stirring was fixed at 250 rpm with a laboratory orbital stirrer at a temperature of 30° C. The pH was brought to 7 with NaOH.

The production fermenter was seeded with 10% of preculture medium and the production medium was then stirred at 900 rpm, with aeration of 1.9 vvm at 30° C., the pH being controlled at 7 with NaOH.

80 g/l of maltose were used as a source of carbon which could be assimilated by *Lactobacillus plantarum*.

The composition of the 2 production media which differed in terms of their nitrogenous substrates (but complying with the nitrogen equivalent) and the lactic acid productivities are given in Table IX below.

TABLE IX

| COMPOSITION | CONCENTRATION IN THE PRODUCTION MEDIUM (G/L) | PRODUCTIVITY AT 24 H (G/L/H) |
|---|---|---|
| Nitrog. composition A | 9 | 2 |
| Nitrog. composition C | 10 | 2.1 |
| Yeast extract (reference) | 5 | 0.8 |

The results obtained show the advantage of the nitrogenous compositions according to the invention for the production of calcium maltobionate.

EXAMPLE 7

The production of lactic acid was carried out under the following conditions. The microorganism used was a *Streptococcus thermophilus*.

The NEW BRUNSWICK production fermenter with a useful volume of 2 l was inoculated with *Streptococcus thermophilus* originating from a 16 h preculture medium.

This preculture medium, introduced in a quantity of 150 ml into a 500 ml Erlenmeyer flask, was composed of:

20 g/l of glucose, 10 g/l of nitrogenous composition A according to the invention (Example 1), 1.5 g/l of $(NH_4)_2PO_4$, 10 g/l of $CaCO_3$, or, for the reference 20 g/l of glucose, 3 g/l of yeast extract, 1.5 g/l of $(NH_4)H_2PO_4$ and 3 g/l of $CaCO_3$ seeded using a square agar plate on which *Streptococcus thermophilus* had been growing for 24 h at 44° C.

Stirring was fixed at 100 rpm with a laboratory orbital stirrer at a temperature of 44° C. The pH was brought to 6.5 with NaOH.

The production fermenter was seeded with 10% of preculture medium and the production medium was then stirred at 100 rpm at 44° C., the pH being controlled at 6.5 with 20% $NH_4OH$.

80 g/l of glucose were used as a source of carbon which could be assimilated by *Streptococcus thermophilus*.

The composition of the 2 production media which differed in terms of their nitrogenous substrates (but complying with the nitrogen equivalent) and the lactic acid productivities are given in Table X below.

TABLE X

| COMPOSITION | CONCENTRATION IN THE PRODUCTION MEDIUM (G/L) | PRODUCTIVITY AT 24 H (G/L/H) |
|---|---|---|
| Nitrog. composition A | 10 | 2 |
| Nitrog. composition C | 10 | 1.9 |
| Yeat extract (reference) | 10 | 1.1 |

For *Streptococcus thermophilus*, the nitrogenous compositions according to the invention therefore constitute a particularly suitable source for the production of calcium lactate.

What is claimed is:

1. A process for the preparation of a nitrogenous composition comprising enzymatically hydrolyzing an aqueous maize gluten solution with at least one enzyme selected from the group consisting of a protease, a complex of endo- and exopeptidases, an enzyme complex that hydrolyzes non-starch polysaccharides of maize, a phytase and a glucoamylase to produce a composition having a ratio of the concentrations of inorganic phosphorus to total phosphorus (Pi/Pt) greater than or equal to 0.05 and a ratio of the concentrations of amine nitrogen to total nitrogen (Na/Nt) greater than or equal to 0.025.

2. The process according to claim 1, comprising the steps of:
   a) introducing into the aqueous maize gluten solution at least one protease;
   b) allowing said at least one protease to act, with stirring;
   c) inactivating said at least one protease; and
   d) recovering thus obtained nitrogenous composition.

3. The process according to claim 2, wherein, in step (a), a complex of endo- and exopeptidases is added to the aqueous solution of maize gluten, after the addition of the at least one protease.

4. The process according to claim 2, wherein, between steps (c) and (d), the insoluble matter is separated.

5. The process according to claim 2, wherein the recovered nitrogenous composition is concentrated.

6. The process according to claim 5, wherein the concentrated recovered nitrogenous composition undergoes an atomisation step.

7. The process according to claim 2, wherein the treatment with said at least one process is carried out on an aqueous solution of maize gluten the dry substance content of which is from 5% to 50%, at a pH of from 5 to 9, a temperature ranging from 45° C. to 65° C. and for a reaction time of from 5 hours to 24 hours.

8. The process according to claim 1, comprising the steps consisting of:

(a) introducing simultaneously into the aqueous maize gluten solution at least one protease, at least one enzyme complex which hydrolyses the polysaccharides of maize other than starch, at least one phytase and at least one glucoamylase;

(b) allowing the enzymes to act, with stirring;

(c) inactivating the enzymes;

(d) recovering the nitrogenous composition thus obtained.

9. The process according to claim 8, wherein, between steps (c) and (d), the insoluble matter is separated.

10. The process according to claim 8, wherein the recovered nitrogenous composition is concentrated.

11. The process according to claim 10, wherein the concentrated recovered nitrogenous composition undergoes an atomisation step.

12. The process according to claim 8, wherein the treatment with enzymes is carried out on an aqueous solution of maize gluten the dry substance content of which is from 5% to 50%, at a pH of from 5 to 9, a temperature ranging from 45° C. to 65° C. and for a reaction time of from 5 hours to 24 hours.

13. A culture medium suitable for culturing microorganisms that produce organic acids comprising a nitrogenous composition having a ratio of the concentrations of inorganic phosphorus to total phosphorus (Pi/Pt) greater than or equal to 0.05 and a ratio of the concentrations of amine nitrogen to total nitrogen (Na/Nt) greater than or equal to 0.025, wherein the said nitrogenous composition is prepared by enzymatically hydrolyzing an aqueous maize gluten solution.

* * * * *